US012700174B2

(12) United States Patent
Kinjo

(10) Patent No.: US 12,700,174 B2
(45) Date of Patent: Aug. 4, 2026

(54) THREE-DIMENSIONAL IMAGE GENERATION DEVICE AND THREE-DIMENSIONAL IMAGE GENERATION METHOD

(71) Applicant: Yamaha Robotics Co., Ltd., Tokyo (JP)

(72) Inventor: Takaya Kinjo, Tokyo (JP)

(73) Assignee: Yamaha Robotics Co., Ltd., Tokyo (JP)

( * ) Notice: Subject to any disclaimer, the term of this patent is extended or adjusted under 35 U.S.C. 154(b) by 343 days.

(21) Appl. No.: 18/292,919

(22) PCT Filed: Jul. 29, 2021

(86) PCT No.: PCT/JP2021/028121
§ 371 (c)(1),
(2) Date: Aug. 20, 2024

(87) PCT Pub. No.: WO2023/007657
PCT Pub. Date: Feb. 2, 2023

(65) Prior Publication Data
US 2025/0371800 A1 Dec. 4, 2025

(51) Int. Cl.
*G06T 17/00* (2006.01)
*G06T 15/50* (2011.01)
(Continued)

(52) U.S. Cl.
CPC .............. *G06T 17/00* (2013.01); *G06T 15/50* (2013.01); *G06V 10/14* (2022.01); *G06V 10/16* (2022.01)

(58) Field of Classification Search
CPC ........... G06T 17/00; G06T 15/50; G06T 1/00; G06T 7/55; G06V 10/14; G06V 10/16; H04N 13/243
See application file for complete search history.

(56) References Cited

U.S. PATENT DOCUMENTS 5,576,828 A 11/1996 Tomiyama et al.
2005/0062954 A1* 3/2005 Wieneke ................. G06T 7/285
356/28
(Continued)

FOREIGN PATENT DOCUMENTS

CN        102439708        5/2012
JP        H10122823        5/1998
(Continued)

OTHER PUBLICATIONS

"International Search Report (Form PCT/ISA/210) of PCT/JP2021/028121", mailed on Oct. 26, 2021, with English translation thereof, pp. 1-4.
(Continued)

*Primary Examiner* — Kee M Tung
*Assistant Examiner* — Thang Gia Huynh
(74) *Attorney, Agent, or Firm* — JCIPRNET

(57) ABSTRACT

A three-dimensional image generation device and a three-dimensional image generation method are provided. The three-dimensional image generation device includes multiple cameras using imaging elements, and a control unit that processes respective images captured by the cameras. The control unit sets multiple voxels in a space including a target object; images the multiple voxels from multiple directions; (a) detects each brightness of each imaging element corresponding to one voxel among the multiple voxels; (b) specifies the lowest brightness among the detected brightnesses as the lowest brightness of the one voxel; (c) specifies, when the specified lowest brightness is at least a prescribed threshold value, the one voxel as a specific voxel including the target object; repeatedly executes the operations of (a) to (c) for all of the multiple voxels;
and generates a three-dimensional image of the target object by connecting the multiple specific voxels specified in (c).

2 Claims, 5 Drawing Sheets

(51) Int. Cl.
  *G06V 10/10*  (2022.01)
  *G06V 10/14*  (2022.01)

(56)    References Cited

U.S. PATENT DOCUMENTS

| | | | |
|---|---|---|---|
| 2020/0258300 A1* | 8/2020 | Schwarz | G06T 12/20 |
| 2021/0025698 A1* | 1/2021 | Kitai | G01B 11/24 |
| 2022/0180494 A1 | 6/2022 | Kinjo et al. | |

FOREIGN PATENT DOCUMENTS

| | | |
|---|---|---|
| JP | 3235009 | 12/2001 |
| JP | 2018032938 | 3/2018 |
| JP | 2021117909 | 8/2021 |
| WO | 2010090605 | 8/2010 |
| WO | 2020217970 | 10/2020 |

OTHER PUBLICATIONS

Mohamed Chafik Bakkay et al., "Seuillage par hysteresis pour le test de photo-consistance des voxels dans le cadre de la reconstruction 3D", retrieved from arXiv database, arXiv:1809.06070, Sep. 17, 2018, pp. 1-3. The relevant translated content was included in the Notice To Submit Written Opinion of Korea Counterpart Application.

"Notice To Submit Written Opinion of Korea Counterpart Application", issued on Jan. 19, 2026, with English translation thereof, pp. 1-10.

* cited by examiner

SNK-10008-00 FIG. 5

Specific voxel on the plane of y = y1

| Voxel ID | Voxel center position Vc | Camera 1 | | Camera 2 | | Camera 3 | | Lowest brightness of pixel = MIN (brightness 1, brightness 2, brightness 3) | Specific voxel |
|---|---|---|---|---|---|---|---|---|---|
| | | Corresponding pixel | Brightness 1 | Corresponding pixel | Brightness 2 | Corresponding pixel | Brightness 3 | | |
| V1 | (x1,y1,h1) | P11 | 0 | P23 | 1 | P31 | 0 | 0 | |
| V2 | (x2,y1,h1) | P12 | 1 | P24 | 0 | P32 | 0 | 0 | |
| V3 | (x3,y1,h1) | P13 | 0 | P25 | 0 | P33 | 1 | 0 | |
| V4 | (x1,y1,h2) | P11 | 0 | P22 | 0 | P32 | 0 | 0 | |
| V5 | (x2,y1,h2) | P12 | 1 | P23 | 1 | P33 | 1 | 1 | specified |
| V6 | (x3,y1,h2) | P13 | 0 | P24 | 0 | P34 | 0 | 0 | |
| V7 | (x1,y1,h3) | P11 | 0 | P21 | 0 | P33 | 1 | 0 | |
| V8 | (x2,y1,h3) | P12 | 1 | P22 | 0 | P34 | 0 | 0 | |
| V9 | (x3,y1,h3) | P13 | 0 | P23 | 1 | P35 | 0 | 0 | |

→ The target object exists at x2, y1, and h2.

FIG. 5

THREE-DIMENSIONAL IMAGE GENERATION DEVICE AND THREE-DIMENSIONAL IMAGE GENERATION METHOD

CROSS-REFERENCE TO RELATED APPLICATION

This application is a 371 application of the International PCT application serial no. PCT/JP2021/028121, filed on Jul. 29, 2021. The entirety of the above-mentioned patent application is hereby incorporated by reference herein and made a part of this specification.

TECHNICAL FIELD

The present invention relates to a three-dimensional image generation device and three-dimensional image generation method of a target object using a camera.

RELATED ART

A method of generating a three-dimensional image of a target object such as a bonding wire (hereinafter referred to as a wire) connecting a pad of a semiconductor chip and a lead of a substrate has been proposed (see, for example, Patent Literature 1).

The method described in Patent Literature 1 is one that illuminates a wire with a ring-shaped illuminator, captures a wire image while changing a depth of focus using an optical system with a shallow focusing height, and detects a dark portion appearing at the center of each wire image, thereby detecting each XY coordinate of the wire at each focusing height, detecting the a three-dimensional shape of the entire wire base on these data, and generating a three-dimensional image.

CITATION LIST

Patent literature

[Patent Literature 1] JP 3235009

SUMMARY OF INVENTION

Technical problem

However, in the method described in Patent Literature 1, it is necessary to capture multiple images by changing the focusing height of the optical system, so there was a problem that it takes a long time to generate a three-dimensional image.

Accordingly, an object of the present invention is to generate a three-dimensional image of a target object in a short period of time.

Solution to Problem

A three-dimensional image generation device of the present invention includes a plurality of cameras using imaging elements, and a control unit that processes respective images captured by the cameras. The control unit sets a plurality of voxels in a space including a target object; images the plurality of voxels from a plurality of directions with the plurality of cameras; (a) detects each brightness of each imaging element of each of the cameras corresponding to one voxel among the plurality of voxels; (b) specifies a lowest brightness among the detected brightnesses detected by each of the cameras as a lowest brightness of the one voxel: (c) specifies, when the specified lowest brightness is at least a prescribed threshold value, the one voxel as a specific voxel including the target object; repeatedly executes operations (a) to (c) for all of the plurality of voxels; and generates a three-dimensional image of the target object by connecting a plurality of the specific voxels specified in (c).

A three-dimensional image generation method of the present invention includes: preparing a plurality of cameras using imaging elements; setting a plurality of voxels in a space including a target object; imaging the plurality of voxels from a plurality of directions using the plurality of cameras: (a) detecting each brightness of each imaging element of each of the cameras corresponding to one voxel among the plurality of voxels: (b) specifying a lowest brightness among the detected brightness detected by each of the cameras as a lowest brightness of the one voxel: (c) specifying, when the specified lowest brightness is at least a prescribed threshold value, the one voxel as a specific voxel including the target object; repeatedly executing operations (a) to (c) for all of the plurality of voxels; and generating a three-dimensional image of the target object by connecting a plurality of the specific voxels specified in (c).

In this manner, images captured by the plurality of cameras are processed to generate a three-dimensional image, a three-dimensional image may be generated without operating hardware such as changing the focusing height of an optical system, and a three-dimensional image of a target object can be generated in a short period of time.

In the three-dimensional image generation method of the present invention, the target object may be illuminated from above, and the plurality of cameras may be set above the target object.

Thereby, a three-dimensional image can be generated by a simple method.

In the three-dimensional image generation method of the present invention, the target object may be a wire connecting an electrode of a semiconductor element and an electrode of a substrate or connecting one electrode of the semiconductor element and another electrode of the semiconductor element.

In this manner, it is possible to generate a three-dimensional image of the wire in a short period of time.

Effects

According to the present invention, a three-dimensional image of a target object can be generated in a short period of time.

BRIEF DESCRIPTION OF DRAWINGS

FIG. 5 is a table for explaining the lowest brightness of each voxel and the processing of specifying of a specific voxel.

DESCRIPTION OF EMBODIMENTS

Figure 1:
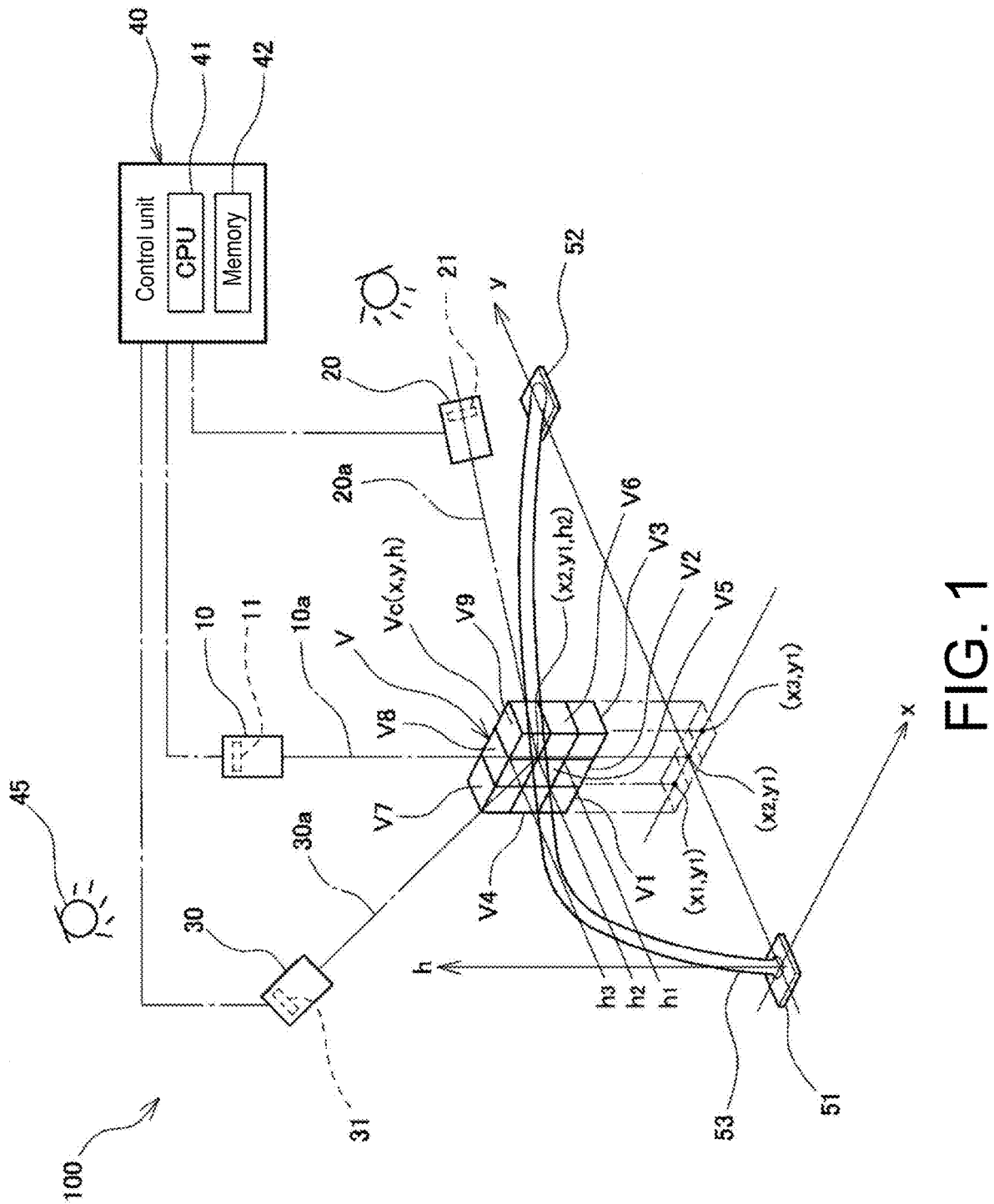
FIG. 1 is a system diagram showing a configuration of a three-dimensional image generation device that executes a three-dimensional image generation method according to an embodiment.

Hereinafter, a three-dimensional image generation device 100 that executes a three-dimensional image generation method of an embodiment will be described below with reference to the drawings. In the description below, although the three-dimensional image generation device 100 will be described as generating a three-dimensional image of a wire 53 connecting an electrode 51 of a semiconductor element and an electrode 52 of a substrate as shown in FIG. 1. it is also possible to generate three-dimensional images of other target objects.

The three-dimensional image generation device 100 includes three cameras 10, 20 30 using imaging elements; a control unit 40 that processes images captured by the cameras 10, 20, 30 to generate a three-dimensional image of the wire 53, which is the target object; and a light source 45 that illuminates the wire 53. In this embodiment, the number of cameras is described as three, but the number is not limited to three, and may be two or four or more.

The light source 45 is arranged above the wire 53. Moreover, the camera 10 is arranged above the wire 53, and the cameras 20, 30 are arranged above the wire 53 such that their respective optical axes 20a, 30a are inclined with respect to an optical axis 10a of the camera 10. The control unit 40 is composed of a computer including a CPU 41 and a memory 42 for processing information therein.

Multiple voxels V are set in a space including the wire 53. The voxels V are set throughout the space where the wire 53 exists. Each center coordinate of the voxel V is represented by Vc (x, y, h). In FIG. 1, nine voxels V1-V9 set in a space including the wire 53 are shown. The nine voxels V1-V9 are positioned in a plane whose center coordinates are Vc (x, y, h) and whose y-direction coordinates are y1, with the x-coordinates positioned at x1, x2, x3 and heights h at h1, h2, h3, respectively. Moreover, the cross section of the wire 53 at y=y1 is positioned at the voxel V5 centered at Vc (x2, y1, h2).

Figure 2:
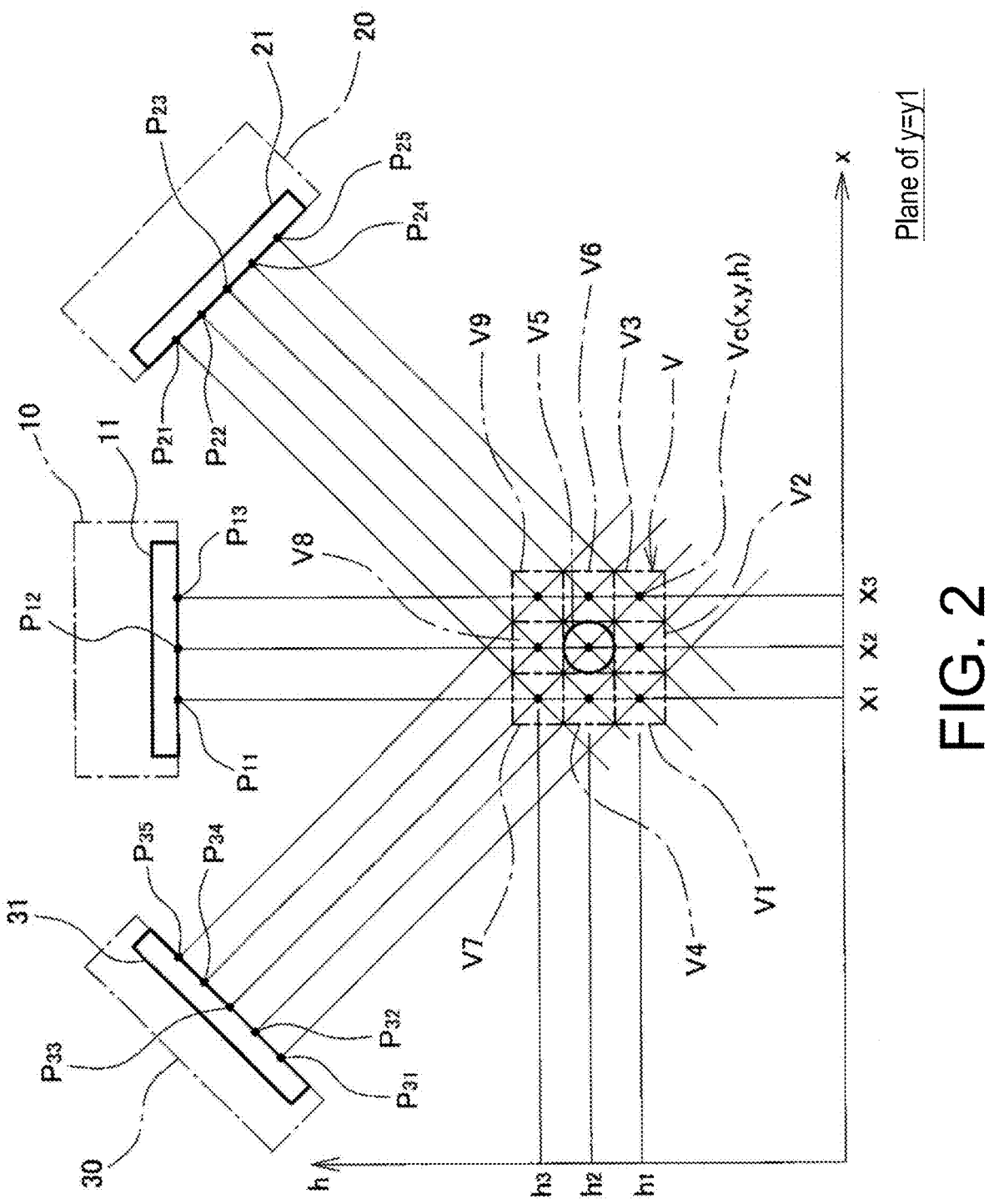
FIG. 2 is an explanatory diagram showing the relationship between the center of each voxel and the position of imaging element of each of the cameras when voxels on a plane of y=y1 shown in FIG. 1 are imaged by multiple cameras.

Next, referring to FIG. 2, an example of the relationship between the nine voxels V1-V9 described with reference to FIG. 1 and the position of each pixel of each imaging element 11, 21, 31 of each of the cameras 10, 20, 30 will be described.

The voxel V1 is at a center position Vc (x1, y1, h1), and corresponds to a pixel P11 of the imaging element 11 of the camera 10, a pixel P23 of the imaging element 21 of the camera 20, and a pixel P31 of the imaging element 31 of the camera 30. Similarly, a center position Vc (x2, y1, h1) of the voxel V2 corresponds to a pixel P12 of the imaging element 11, a pixel P24 of the imaging element 21, and a pixel P32 of the imaging element 31. Moreover, a center position Vc (x3, y1, h1) of the voxel V3 corresponds to a pixel P13 of the imaging element 11, a pixel P25 of the imaging element 21, and a pixel P33 of the imaging element 31. Similarly, a center position Vc (x1, y1, h2) of the voxel V4 corresponds to the pixel P11, a pixel P22, the pixel P32; a center position Vc (x2, y1, h2) of the voxel V5 corresponds to the pixel P12, the pixel P23, the pixel P33; a center position Vc (x3, y1, h2) of the voxel V6 corresponds to the pixel P13, the pixel P24, a pixel P34. Furthermore, a center position Vc (x1, y1, h3)

of the voxel V7 corresponds to the pixel P11, a pixel P21, the pixel P33; a center position Vc (x2, y1, h3) of the voxel V8 corresponds to the pixel P12, the pixel P22, the pixel P34; and a center position Vc (x3, y1, h3) of the voxel V9 corresponds to the pixel P13, the pixel P23, a pixel P35.

Then, when the voxels V1-V9 are imaged by the cameras 10, 20, 30, the brightness of each of the voxels V1-V9 is detected as the brightness of each corresponding pixel of each of the imaging elements 11, 21, 31 of each of the corresponding cameras 10, 20, 30.

Next, the operation of the three-dimensional image generation device 100 will be described with reference to FIGS. 3 to 5.

Figure 3:
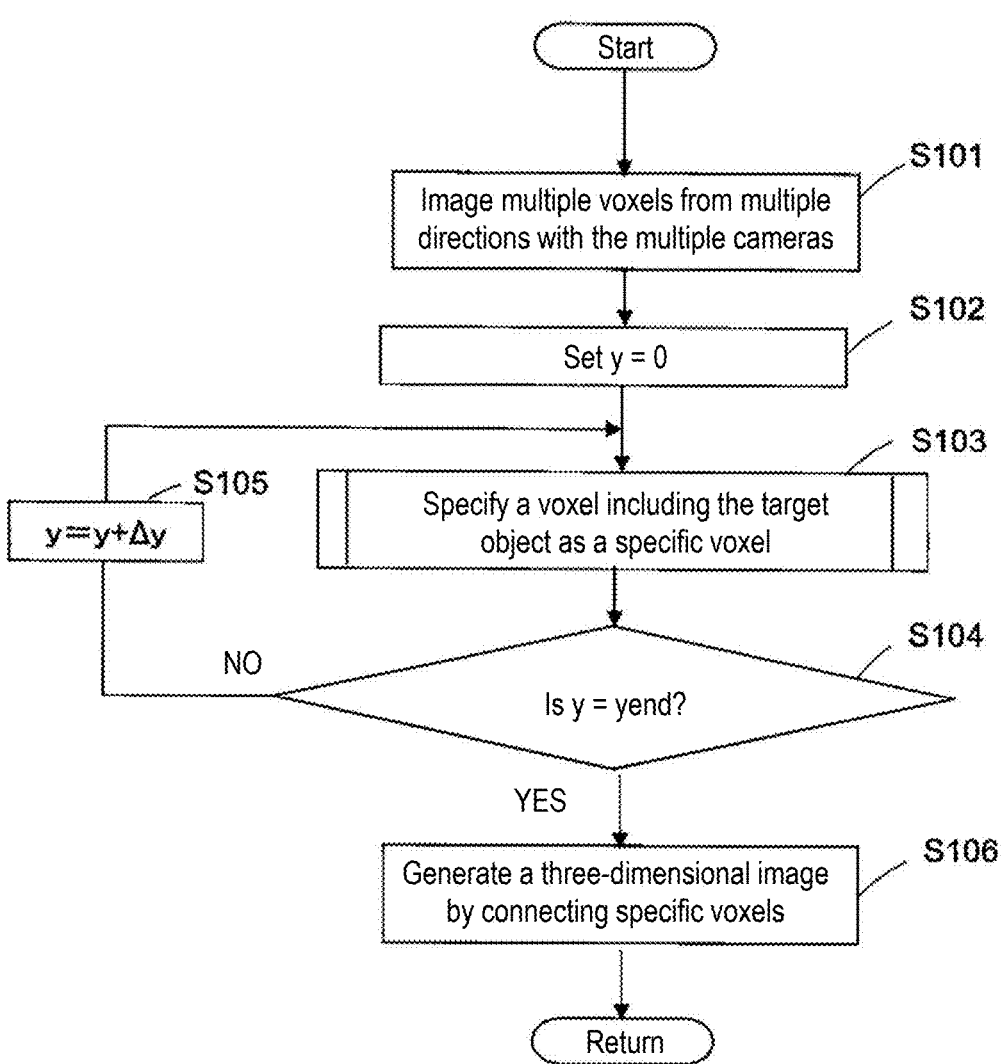
FIG. 3 is a flow chart showing the process of a three-dimensional image generation method according to an embodiment.

The CPU 41 of the control unit 40 of the three-dimensional image generation device 100 images multiple voxels V from multiple directions with the multiple cameras 10, 20, 30, as shown in step S101 of FIG. 3. Next, in step S102, image analysis planes captured by each of the cameras 10, 20, 30 is set to a plane of y=0, and in step S103, the voxel V including the wire 53, which is the target object, in the plane of y=0 is specified as a specific voxel. Then, in step S105, y is increased by Δy until y becomes yend, which is the maximum value of y where voxel V exists, and step S103 is repeatedly executed. Then, if YES is determined in step S104, the process advances to step S106 in FIG. 3, where the multiple specific voxels specified in step S103 are connected to generate a three-dimensional image of the target object.

Here, an example of the processing of specifying the specific voxel including the target object in step S103 of FIG. 3 executed by the CPU 41 of the control unit 40 will be described with reference to FIGS. 4 and 5. In the following description, a processing of specifying a specific voxel including the wire 53, which is the target object, in the voxels V1-V9 with the center coordinates positioned on a plane of y=y1 shown in FIG. 1 will be described.

As described with reference to FIG. 3, when the voxels V1-V9 are imaged by the cameras 10, 20, 30, the brightness of each of the voxels V1-V9 is detected as the brightness of each corresponding pixel of each of the imaging elements 11, 21, 31 of each of the corresponding cameras 10, 20, 30. The voxel V including the wire 53 reflects light by the wire 53, and thus high brightness 1 is detected for the pixel corresponding to the voxel V including the wire 53. On the other hand, a voxel V that does not include the wire 53 does not reflect light, and thus low brightness 0 is detected. However, if there are other voxels V including the wire 53 in an optical path between the voxel V and the pixel or on an extension of the optical path, high brightness 1 is detected for the other voxels V.

Figure 4:
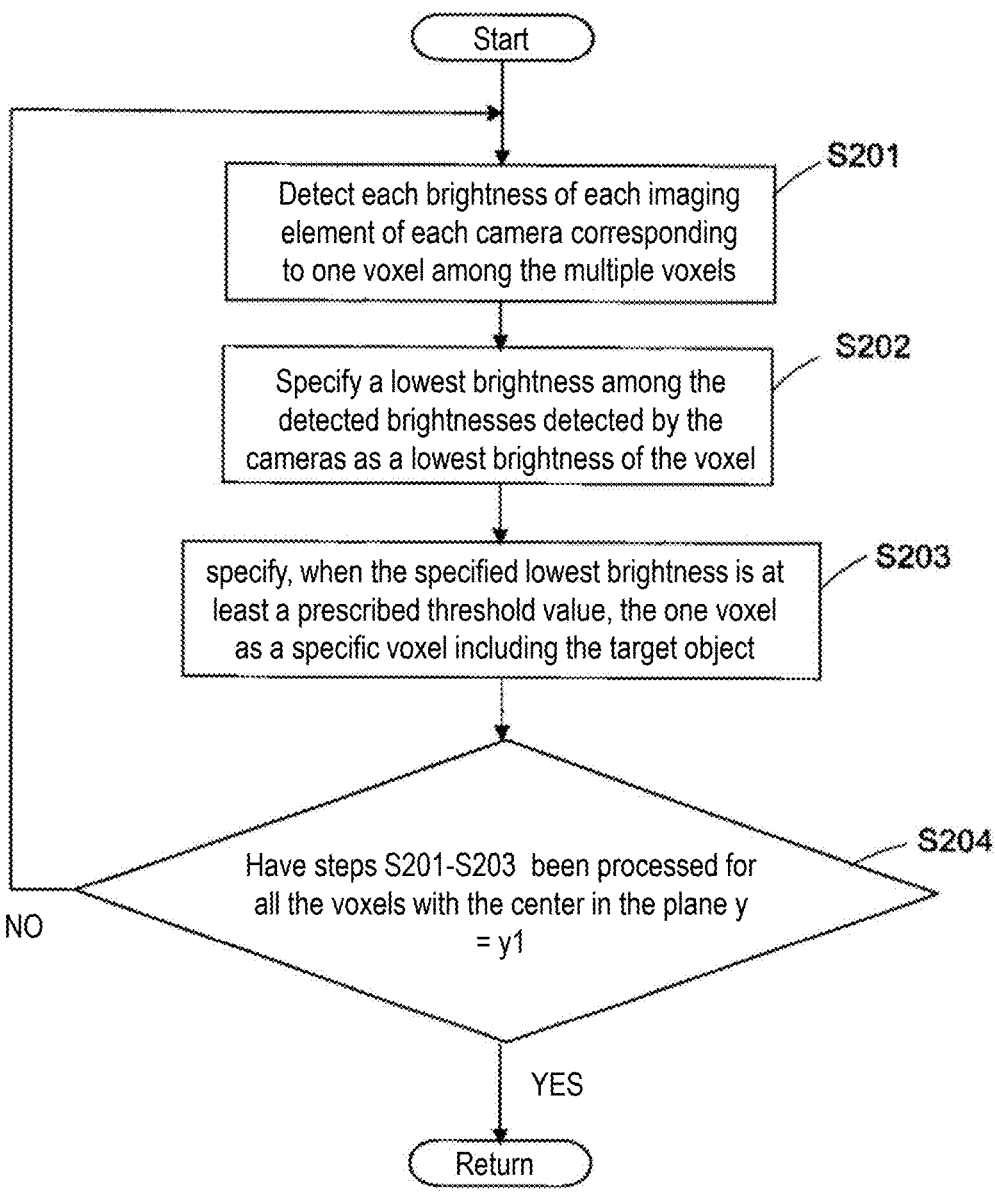
FIG. 4 is a flow chart showing processing of specifying a specific voxel including a target object in the process shown in FIG. 3.

As shown in step S201 of FIG. 4, the CPU 41 of the control unit 40 detects each brightness of each of the imaging elements 11, 21, 31 of each of the cameras 10, 20, 30 corresponding to one voxel among the multiple voxels V from the images captured by the cameras 10, 20, 30.

A case where the CPU 41 detects the brightness of the voxel V1 will be described. As shown in FIGS. 2 and 5, the voxel VI is a voxel V that does not include the wire 53. For the pixels P11 and P31 of each of the imaging elements 11, 31 of the corresponding cameras 10, 30, low brightness 0 of the voxel V1 is detected because the wire 53 does not exist between the pixels P11, P31 and the voxel V1. On the other hand, for the pixel P23 of the imaging element 21 of the corresponding camera 20, high brightness 1 of the voxel V5 is detected instead of the low brightness 0 of the voxel V1 because the voxel V5 including the wire 53 exists between the voxel V1 and the pixel P23. Thus, as shown in FIG. 5, the CPU 41 detects the brightness of the three pixels P11, P23, and P31 corresponding to the voxel V1 as brightness 0, 1, 0, respectively.

Next, the CPU 41 advances to step S202 in FIG. 4 and specifies a lowest brightness among the detected brightnesses detected by the cameras 10, 20, 30 as a lowest brightness of the voxel V. For the voxel V1, the detected brightnesses are 0, 1, 0, thus 0 is specified as the lowest brightness.

Then, the CPU 41 advances to step S203 in FIG. 4, and specifies, when the specified lowest brightness is at least a prescribed threshold value, the one voxel as a specific voxel including the wire 53, which is the target object. The threshold value may be a prescribed value higher than 0, for example 1. In the case of the voxel V1, since the lowest brightness is 0, the CPU 41 does not specify the voxel V1 as a specific voxel, and advances to step S204 in FIG. 4 to determine whether steps S201-S203 have been processed for all the voxels V with the center in the plane y=y1, and if NO, returns to step S201 for processing steps S201-S203 for a next voxel V.

After the processing of the voxel V1, the CPU 41 determines NO in step S204 of FIG. 4, returns to step S201 of FIG. 4, and performs the processing of steps S201-S203 for the voxel V2.

As shown in FIG. 5, the CPU 41 detects the brightness of the three pixels P12, P24, P32 corresponding to the voxel V2, as with the voxel V1. In this case, since the voxel V5 including the wire 53 is positioned between the voxel V2 and the pixel P12, brightness 1 is detected for the pixel P12. Thus, the CPU 41 detects the brightness of the three pixels P12, P24, P32 corresponding to the voxel V2 to be 1, 0, 0. Then, the CPU 41 specifies the lowest brightness of the voxel V2 as 0 in step S202, and advances to step S204 in FIG. 4 without specifying the voxel V2 as a specific voxel in step S203 for the processing of the voxel V3.

Hereinafter, similarly, the CPU 41 specifies the brightness of each pixel for the voxels V3-V4 as shown in FIG. 5, specifies the lowest brightness as 0, and does not specify the voxels V3-V4 as specific voxels.

The CPU 41 detects the brightness of each of the pixels P12, P23, P33 corresponding to the voxel V5. Since the voxel V5 is voxel V including the wire 53, high brightness 1 is detected for the pixels P12, P23, P33 corresponding to the imaging elements 11, 21, 31 of the cameras 10, 20, 30. Thus, the CPU 41 specifies the lowest brightness of the voxel V5 as 1, specifies the voxel V5 as a specific voxel, and proceeds with the processing of the voxel V6.

As shown in FIG. 5, the CPU 41 specifies the brightness of each pixel corresponding to the voxel V6 as 0, 0, 0 in step S201. Then, in step S202, the CPU 41 specifies the lowest brightness of the voxel V6 as 0, and proceeds with the processing the voxel V7 without specifying the voxel V6 a specific voxel.

The voxel V7 has the wire 53 positioned on an extension of an optical path between the voxel V7 and the corresponding pixel P33 of the camera 30. Thus, the CPU 41 specifies the pixels P11, P21, P33 corresponding to the voxel V7 as 0, 0, 1, respectively. Then, the CPU 41 specifies the lowest brightness of the voxel V7 as 0, and proceeds to process the voxels V8, V9 without specifying the voxel V7 a specific voxel.

As with voxel the V7, the CPU 41 detects the brightness of the corresponding pixels of the voxels V8, V9 as 1, 0, 0 and 0, 1, 0, respectively, specifies each lowest brightness as 0, advance to step S204 in FIG. 4 without specifying the voxels V8, V9 as specific voxels, determines YES in step S204, and ends the process of specifying the voxels to be specified including the target object shown in step S103 of FIG. 3.

Through this processing, among the nine voxels V1-V9 at the coordinate center on the plane of y=y1. the CPU 41 specifies only the voxel V5 including the wire 53 as a specific voxel, as shown in FIG. 5.

After changing y by Δy and executing the processing of step S103 in FIG. 3 in all the spaces in which the voxel V exists, the CPU 41 determines YES in step S104 in FIG. 3, advances to step S106 in FIG. 3, and generates a three-dimensional image of the wire 53 by connecting specific voxels on each plane.

In this manner, in the three-dimensional image generation method of the embodiment, multiple voxels V are set in a space including a target object, and when multiple voxels V are imaged from different angles by the multiple cameras 10, 20, 30, the brightness detected by each pixel of each of the cameras 10, 20, 30 corresponding to the voxel V including the target object is high brightness 1 due to reflection by the target object, and the lowest brightness of the voxel V is 1. On the other hand, at least one of the brightness detected by each pixel of each of the cameras 10, 20, 30 corresponding to the voxel V in which the target object does not exist is low brightness 0, and the lowest brightness of the voxel V is 0. As a result, when the lowest brightness is 1, the voxel V is specified as a specific voxel including the target object, and the specific voxels are connected to generate a three-dimensional image of the target object.

As explained above, since the three-dimensional image generation device 100 of the embodiment processes images captured by the multiple cameras 10, 20, 30 to generate three-dimensional images, a three-dimensional image may be generated without hardware operations such as changing the focusing height of the optical system, and a three-dimensional image of a target object such as the wire 53 can be generated in a short period of time.

What is claimed is:

1. A three-dimensional image generation device generating a three-dimensional image of a wire connecting an electrode of a semiconductor element and an electrode of a substrate or connecting one electrode of the semiconductor element and another electrode of the semiconductor element, the three-dimensional image generation device comprising:

a plurality of cameras using imaging elements;

a control unit that processes respective images captured by the cameras; and illumination that illuminates the wire from above, wherein the control unit:

sets a plurality of voxels in a space including the wire;

illuminates the wire from above with the illumination and images the plurality of voxels from a plurality of directions with the plurality of cameras;

(a) detects each brightness of each imaging element of each of the cameras corresponding to one voxel among the plurality of voxels;

(b) specifies a lowest brightness among the detected brightnesses detected by each of the cameras as a lowest brightness of the one voxel;

(c) specifies, when the specified lowest brightness is at least a prescribed threshold value indicative of reflected light of the wire, the one voxel as a specific voxel including the wire;

repeatedly executes operations (a) to (c) for all of the plurality of voxels; and generates a three-dimensional image of the wire by connecting a plurality of the specific voxels specified in (c).

2. A three-dimensional image generation method generating a three-dimensional image of a wire connecting an electrode of a semiconductor element and an electrode of a substrate or connecting one electrode of the semiconductor element and another electrode of the semiconductor element, the three-dimensional image generation method comprising:

preparing a plurality of cameras using imaging elements and illumination that illuminates the wire from above;

setting a plurality of voxels in a space including the wire;

illuminating the wire from above with the illumination and imaging the plurality of voxels from a plurality of directions with the plurality of cameras;

(a) detecting each brightness of each imaging element of each of the cameras corresponding to one voxel among the plurality of voxels;

(b) specifying a lowest brightnesses among the detected brightness detected by each of the cameras as a lowest brightness of the one voxel;

(c) specifying, when the specified lowest brightness is at least a prescribed threshold value indicative of reflected light of the wire, the one voxel as a specific voxel including the wire;

repeatedly executing operations (a) to (c) for all of the plurality of voxels; and generating a three-dimensional image of the wire by connecting a plurality of the specific voxels specified in (c).

* * * * *